8644X

G. M. Alson,

Rotary Steam Engine,

Patented Feb. 20, 1835.

Feb. 20. 1835 883

8644X

George M. Alsop

Letters Patent

The Schedule referred to in these Letters Patent and making part
of the same containing a description in the words of the said George
M. Alsop himself of his improvement "in the steam Engine
called the Rotary Steam power Engine".

To all persons to whom these presents may come, be it
known that I George M. Alsop of the Northern Liberties of Phil-
adelphia in the State of Pennsylvania have invented construc-
ted and applied to use a new and useful improvement in the
steam Engine called the Rotary Steam power Engine, specifi-
ed and described as follows. I construct a cylindrical steam cham-
ber in the centre of which revolves a cylinder on its axis. to the periphery
of which is attached one or more arms having slides adjusted to the cir-
cumference of the chamber by screws or springs so as to insure their
revolving steam tight around it, the cylinder by which by way of distinc-
tion. I denominate the piston cylinder, has segments which by ad-
justing screws will compensate any wear that may take place
in its revolution with the valve cylinder hereafter described so as
to keep them perfectly steam tight. the ends of the cylinder with
the exception of a narrow ring on the circumference are to be turned
off so as to diminish the friction with the plates of steam chamber.
and to form cavities for the reception of oil to lubricate interior.
On one side of the chamber and intersecting it shall be placed an-
other chamber for the valve cylinder to revolve in. which it must do
steam tight either against its circumference or packing boxes
with adjusting screws. This cylinder must correspond in size
with its relative motion with the piston cylinder. but the valve
and piston cylinders of equal size & motion are the most elegible.
The valve cylinder must have on its circumference a groove or
grooves of the requisite form to allow the arms to pass in that
part of their revolution steam tight. One end of the valve cyl-
inder

Figure 1:
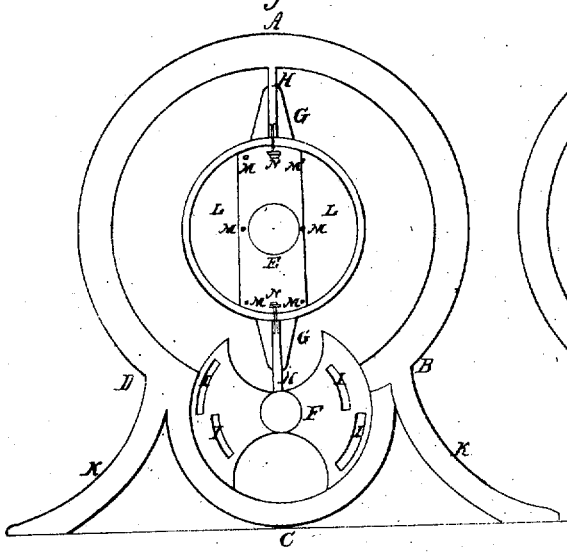
Figure 2:
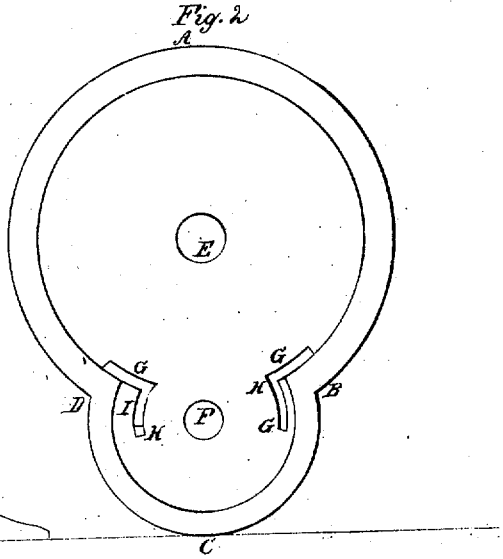
Figure 3:
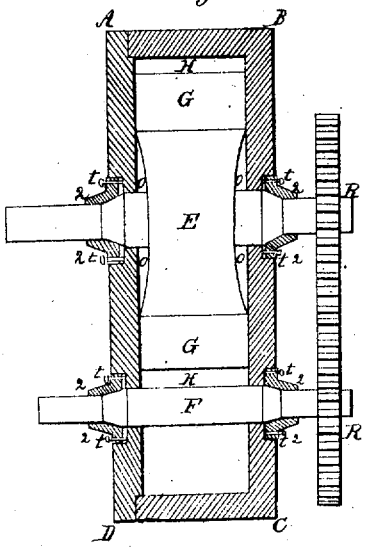

8644X inder has grooves corresponding with the steam passage and arran-
ged so as to shut off and admit the steam, thus acting as valves.
The apertures or steam passages in the plate have shifting stops
or slides to be used when the motion of the engine is wanted to
be changed. These may be connected with the ordinary slide valve
or four way cock. The two cylinders being connected by cog wheels
on their shafts revolve together & touch on their peripheries except
when the arms are passing the grooves thus forming a fulcrum
for the steam. The shafts may be fitted in conical boxes with
adjusting screws to compensate any wear and insure their revolv-
ing always in the same centre. What I claim in this Engine is the
peculiar arrangement and construction taken as a whole and
not its several parts individually except the arrangement and
construction of the segments of the piston cylinder so as to adapt
to any wear that may take place. And also the arrangement
of the valve cylinder & shifting stops or slides. I also claim and
intend said described engine to be used as a water power engine,
in which case the adjusting parts may be dispensed with and the
water be let immediately into the chamber without the interposi-
tion of valves. Manner of Operation (see drawings.) The steam
passes through the apertures G. G. or I. G. Fig. 2nd according
to the direction of motion, and the grooves I.I.I.I. in the valves
Fig 1st acts upon the arm or arms G. H. Fig. 1st causing the
piston cylinder to revolve until said arm passes the aperture
on the opposite side of the valve cylinder when the steam es-
capes into the air or condenser and the arm passes through the
grooves and is again exposed to the action of the steam. the two
cylinders revolving steam tight no steam can escape between
them; the same effects are produced by the action of water in
stead of steam thus causing a constant revolving motion which
may be communicated to any machinery by gearing placed
on the end of either shaft. Description of the Plates.
A.B.C.D. Fig. 1 and 3. represents the steam chamber. E the piston
cylinder linder. F. the valve cylinder G. G. that portion of the piston cyl
der in which the slides H. H. are confined Fig. 1 I. I. I. I.
presents the end of the valve cylinder corresponding with the open
gs I. G. and G. G. fig. 2nd K. K. represents the supports of the ma
ine. L. L. are segments of the piston cylinder which may be mov
by adjusting screws m, m, m, m. n, n are the adjusting screws
springs which keep the slides H. H. to the periphery of steam
ylinder 2 fig 3. represent the conical boxes in which the shafts
the cylinders revolve. O. O. are cavities for holding oil to be sup-
lied by holes through the plates of the steam chamber. R. R. are
e cog wheels which regulate the motion of the cylinders Fig 2nd
A. B. C. D. represents one end of the steam chamber in the inside.
E. F. are the openings for the shafts of the cylinders. I. G. and
G. G. are the openings or grooves for the admission and emission of
team or water H. H. are the steam stops or slides for changing
he motion sliding from top to bottom of passages. In testimony
hat the above is a true specification of my said improvement as above
escribed. I have hereto set my hand and seal the 28th day of
he first month in the year of our Lord one thousand eight
hundred and thirty five Witnesses George M. Alsop
James Calver
Robert Alsop (Drawing)

Exd
H.G.C.

1008 wds]